United States Patent [19]

Howeth

[11] 4,440,243

[45] Apr. 3, 1984

[54] DRILL CUTTINGS CONVEYING HEAD WITH WET CUTTINGS DIVERTER

[76] Inventor: D. Franklin Howeth, 233 Chuck Wagon Trail, Forth Worth, Tex. 76108

[21] Appl. No.: 330,134

[22] Filed: Dec. 14, 1981

Related U.S. Application Data

[63] Continuation-in-part of Ser. No. 223,036, Jan. 7, 1981.

[51] Int. Cl.³ .................. E21B 21/06; E21C 7/02
[52] U.S. Cl. ......................... 175/209; 175/206; 175/214; 175/218
[58] Field of Search ............. 175/69, 71, 65, 209, 175/206, 211, 214, 218

[56] References Cited

U.S. PATENT DOCUMENTS

| | | | |
|---|---|---|---|
| 2,144,586 | 1/1939 | Kelley | 175/209 X |
| 2,975,847 | 3/1961 | Feucht | 175/213 X |
| 3,351,143 | 11/1967 | Seibold et al. | 175/209 |
| 3,811,518 | 5/1974 | Kalaf et al. | 175/206 X |
| 4,223,748 | 9/1980 | Barendsen | 175/209 X |
| 4,332,301 | 6/1982 | Jonell | 175/206 X |

FOREIGN PATENT DOCUMENTS 692997 10/1979 U.S.S.R. .................. 175/209

*Primary Examiner*—Stephen J. Novosad
*Attorney, Agent, or Firm*—Hubbard, Thurman, Turner & Tucker

[57] ABSTRACT

A drill cuttings conveying head member having a tubular duct portion which includes a movable sidewall forming a gate operable to be pivoted into a position blocking the flow passage in the duct portion and diverting the flowstream out of the conveying head during wet drilling conditions. A lever mechanism is connected to the gate and is operable to bias the gate in either the open or closed position.

11 Claims, 3 Drawing Figures

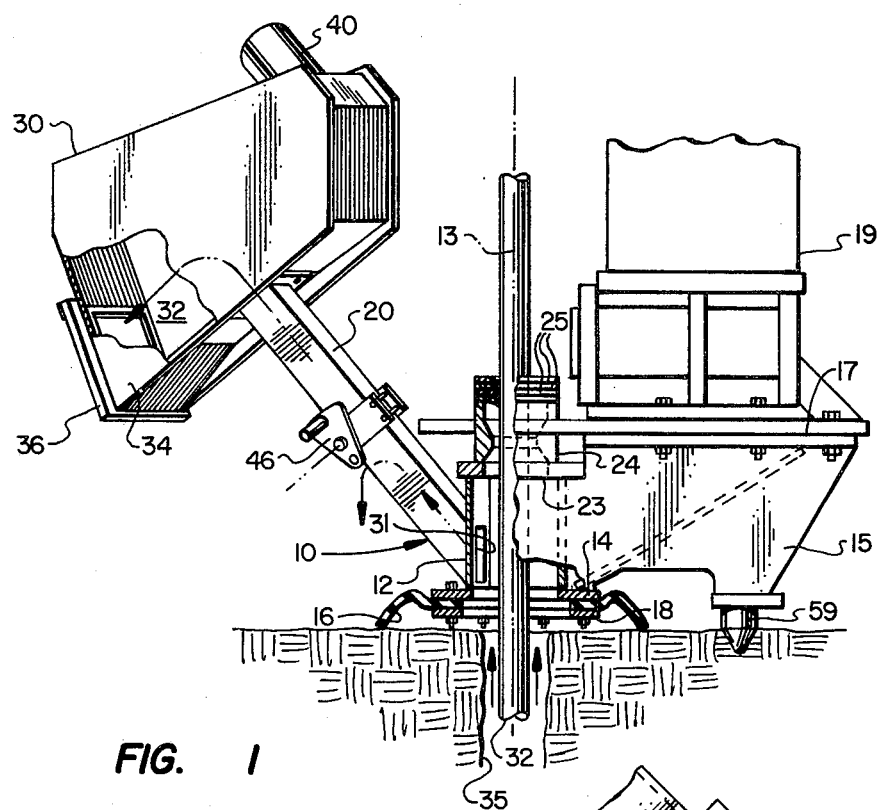
FIG. 1
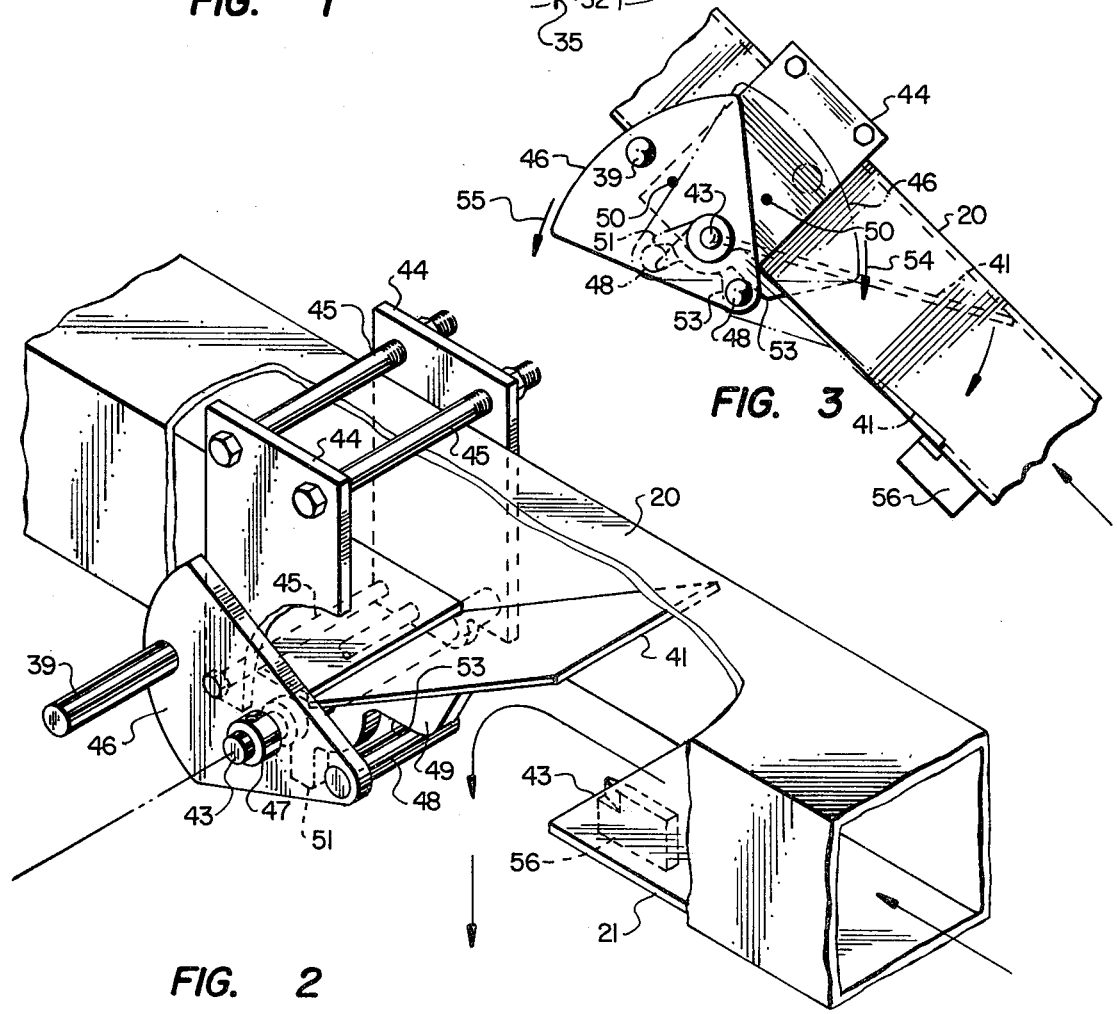
FIG. 2
FIG. 3

DRILL CUTTINGS CONVEYING HEAD WITH WET CUTTINGS DIVERTER

CROSS REFERENCE TO RELATED APPLICATION

This application is a continuation-in-part of copending Applicaton Ser. No. 223,036 filed Jan. 7, 1981.

BACKGROUND OF THE INVENTION

The present invention pertains to an improved dust conveying or lifting head adapted to be used in conjunction with earth drilling equipment for conveying an air flowstream laden with particulate matter from a drillhole to a separating and collecting system for both the fine and coarse drill cuttings.

BACKGROUND ART

The above referenced patent application pertains to improvements in conveying and collecting systems for airborne particulate matter, and in particular, a total collection system for particulate matter being discharged from a drillhole by a bailing air flowstream during drilling operations. The referenced application, which is incorporated herein by reference, discloses several embodiments of a device which is referred to as a material lifting head. Basically, the lifting head is characterized by an enclosure which is disposed around the mouth of the drillhole for receiving a jet flowstream of air laden with particulate matter comprising fine and coarse drill cuttings which are formed during the drilling operation. The lifting heads disclosed in the referenced application include conveying duct portions which include or are connected to means for separating drill cuttings from the flowstream by a combination of one or more techniques including gravitational separation, direct impingement, and inertial separation caused by change of direction of the flowstream. Fine material not separated by any of the aforementioned actions is conducted to further collecting structure which performs secondary operations in the way of inertial and/or impingement separation before passing the flowstream through a porous media impingement type filter element from which substantially dust free air is returned to the atmosphere.

A longstanding problem associated with conveying drill cuttings from a drillhole pertains to handling of cuttings under conditions when the cuttings themselves become wetted before being ejected from the drillhole. Under some types of drilling conditions water or other liquids are encountered during drilling and the airborne particulate matter or dust becomes wet before or while being ejected from the drillhole. Under such operating conditions, the gravitational and inertial separator mechanisms become somewhat ineffective and/or the conveying duct portion of the lifting heads tend to clog with mud formed by the wet cuttings. With prior art dust conveying and collecting equipment it becomes necessary to periodically move the hood or lifting head away from the drillhole to unclog the cuttings flow path and to prevent total plugging of the cuttings flow passages within the equipment. This operation is difficult or sometimes impossible to accomplish while maintaining drilling and cuttings evacuation operations, particularly with a hood or lifting head which is fixed to the base of the mast or feed beam of the drill rig.

It has been determined in accordance with the present invention that in order to overcome the abovenoted problems it would be desirable to provide the head with a diverter gate or doorway through which substantially all of the drill cuttings may be ejected to a collection point on the ground surface away from the immediate vicinity of the drillhole but close enough to the lifting head that the material leaves the head before it is likely to clog the interior of the head or any duct portions interconnecting the head with enclosures comprising gravitational or inertial separating chambers.

SUMMARY OF THE INVENTION

The present invention provides an improved drill cuttings conveying or lifting head particularly adapted for operation under drilling conditions which result in the drill cuttings becoming wet and formed into clumps or coatings of mud which may cause malfunctioning of the conveying and collection system including clogging of the conveying duct leading away from the lifting head. The improved lifting head includes means forming a diverter valve or gate arrangement which provides for temporarily diverting the drill cuttings away from the lifting head in the immediate vicinity of the head but placing the cuttings at a location sufficiently removed from the drillhole to minimize the chances of the cuttings reentering the hole.

In particular, the present invention is directed to an improved lifting head for a dust conveying and collection system wherein a duct portion of the head which projects upwardly from the head at an angle with respect to the drill stem axis is provided with a movable wall portion which may be pivotally swung into a position within the interior of the duct portion to divert substantially all of the air flowstream and material conveyed thereby out through an opening in the duct portion. The cuttings are deflected for deposit on the ground surface adjacent the drillhole but sufficiently removed therefrom as to minimize the problems associated with prior art drill cuttings collecting hoods. Moreover, during the operation of the total conveying and collection system wherein the cuttings being ejected from the hole are rather thoroughly wetted, there is little need for control of fine dust particles since these have been coagulated into relatively large particles or clumps which would only clog the conveying duct portion, the inertial separator portion and the fine material collection unit or separator of the total collection system.

The present invention also provides a material lifting head diverter gate having a mechanically simple and reliable actuator mechanism which provides for biasing the gate in both open and closed positions with respect to the material conveying duct.

Those skilled in the art will appreciate further advantages and superior features of the present invention upon reading the detailed description which follows in conjunction with the drawings.

BRIEF DESCRIPTION OF THE DRAWINGS

FIG. 1 is a vertical elevation, partially sectioned, of one embodiment of a drill cuttings lifting head in accordance with the present invention;

FIG. 2 is a perspective view, partially broken, and illustrating the structural details of the cuttings diverter gate; and FIG. 3 is a detail view showing the open and closed positions of the diverter gate.

DESCRIPTION OF THE PREFERRED EMBODIMENTS

Referring to FIG. 1 of the drawings, there is disclosed apparatus comprising a material lifting head for use in conjunction with a portable earth drilling rig and generally designated by the numeral 10. The material lifting head 10 is of a type which is particularly adapted for use in conjunction with a percussion type drilling rig such as the drilling rig disclosed in Application Ser. No. 223,036 and illustrated in FIG. 9 of the drawings thereof. The lifting head 10 includes a substantially vertical hollow tubular duct portion 12 having a lower annular flange 14 to which is secured a flexible skirt or secondary sealing member 16. The skirt 16 is secured to the flange 14 by a plate 18 in a conventional manner such as by a plurality of threaded fasteners. The head 10 includes a mounting bracket portion 15 which includes an upwardly facing mounting surface 17 adapted to be bolted to the foot of a mast 19 of the drill rig. In response to a pulldown or downcrowding force exerted on the mast 19, the plate 18 is normally forcibly engaged with the ground surface around the drillhole. The mounting bracket 15 also advantageously comprises a mast foot portion including a ground engaging anchor or stinger member 59.

The lifting head 10 also includes a material conveying duct 20 having a generally rectangular cross-sectional configuration and connected at one end to the duct portion 12. The duct 20 is in communication with the interior of the duct portion 12 through an opening 31, FIG. 1, and projects upwardly at an angle of approximately 45° with respect to the longitudinal central axis 13 of the duct portion 12, which axis is substantially coincident with the longitudinal axis of a drill stem 32. The drill stem 32 may be of a conventional type including one or more elongated drill rod sections interconnected end to end by suitable coupling members, not shown, and connected at the lower end to a percussion bit, also not shown. The head 10 still further includes an upper transverse end wall 23 which supports a sealing ring 24 having a plurality of resilient annular seal members 25 mounted thereon in stacked relationship to each other. The seal members 25 each include a central opening and radially extending slits forming sector parts proportioned so as to permit the drill stem 32 including the coupling members to be withdrawn through the head and the ring 24. The seal members 25 are proportioned to be in close fitting relationship to the drill stem to minimize the flow of air into or out of the duct portion 12. The ring 24 is of sufficient weight that under substantially all drilling conditions the bailing air flowstream emanating from the drillhole will not raise the ring to permit drill cuttings to be blown out through the top of the duct portion 12. Normally, under preferred operating conditions, the differential pressure within the interior of the lifting head 10 would not provide any tendency for the ring 24 to be lifted off of the end wall 23.

The duct 20 is connected at its upper end to a coarse drill cuttings separation enclosure, generally designated by the numeral 30. The enclosure 30 is characterized by an enlarged interior chamber 32 in communication with the interior flow passage formed by the duct 20. The chamber 32 includes a generally vertically depending portion 34 forming a hopper for collection of coarse drill cuttings. A resilient door 36 is operable to open momentarily to discharge material from the chamber 34. The enclosure 30 also includes an outlet duct 40 which leads to a fine drill cuttings separation and collection unit, not shown, which is preferably of the type disclosed in Application Ser. No. 223,036.

FIG. 2 illustrates a part of the tubular duct 20 partially broken away to show the rectangular cross-sectional configuration and illustrating a lower sidewall 21. The duct 20 includes a movable wall part 41 comprising a diverter valve or gate for diverting substantially all of the flow of drill cuttings out of the duct through an opening 43 formed by the gate. The gate 41 is movable to the position shown in FIG. 2 for substantially blocking the interior passageway of the duct 20 to divert the flowstream of drill cuttings out of the head and onto the ground surface adjacent the drillhole 35. The gate 41 is secured along one lateral side to a pivot shaft 43 which is rotatably journalled is spaced apart bearing plates 44. The bearing plates 44 are removably secured to the duct 20 by suitable means such as bolts 45. The plates 44 may also be integrally formed as part of the duct 20.

The gate 41 is maintained in its open and closed positions by actuating means comprising a somewhat circular sector shaped lever 46 pivotally mounted on the shaft 43 and retained on the shaft by a removable hub 47. The lever 46 includes a pin 48 projecting generally parallel to the longitudinal axis of the shaft 43. The pin 48 comprises part of a lost motion coupling between the lever 46 and the gate 41 and is engageable with a cam 49 formed on the gate, as shown. The lever 46 also includes an operating handle member 39 projecting in a direction opposite to the pin 48.

In the closed position of the gate 41, the lever 46 is in the pivotal position shown by the dashed lines in FIG. 3 and the center of gravity 50 of the lever is located such that, in the normal operating position of the head 10, the lever is biased in the position shown and indicated by the arrow 54 with the pin 48 forcibly engaged with a projection 51 on the cam. However, in response to moving the lever 46 to the position illustrated by the solid lines in FIG. 3, the pin 48 moves to engage a surface 53 on the cam 49 and, upon further rotation, pivots the gate 41 to the open position. The gate 41 is biased in the open position by the lever 46 whose center 50 of gravity has now moved to a position tending to rotate the lever in the direction indicated by the arrow 55. Accordingly, the gate 41 is stable in both the maximum open and closed positions. The gate 41 is also supported in its closed position by a still plate 56 projecting across an edge of the opening 43. The provision of the lost motion coupling formed by the cam 49 and the pin 48 enables the operator to forcibly rotate the lever 46 in either direction to impact the cam to release the gate 41 from a stuck condition which might be caused in freezing weather, for example.

Those skilled in the art will appreciate that other actuating means such as hydraulic or pneumatic cylinder actuators could be employed to move and positively hold the gate 41 in one position or the other. When the gate 41 is moved to the position shown in FIG. 2 for diverting flow out of the duct 20, it is also normally biased in that position by a pressure differential created by maintaining a suction pump, not shown, connected to the duct 40, in operation to produce a substantial vacuum within the chamber 32 and the portion of the duct 20 connected thereto.

The provision of the flow diverting gate 41 is particularly advantageous for the lifting head 10, which is normally fixed to a drill rig mast in such a way that it is not movable relative to the mast. The arrangement of the lifting head 10 is such that it cannot normally be lifted away from the drillhole 35 during drilling operations and yet it is necessary to divert the flow of drill cuttings from the head as close to the mouth of the drillhole as practical in order to prevent clogging of the remainder of the conveying and collection system.

Accordingly, when wet drilling conditions are encountered with a drilling rig using the lifting head 10, substantially all of the drill cuttings flowstream may be diverted to a point removed from the immediate vicinity of the drillhole but also without requiring the conveying of the material through the major portion of the duct 20 or into the enclosure 30. The rig operator, on sensing the commencement of wet drilling conditions, would operate the gate 41 to open by rotating the lever 46 to the position shown in FIG. 2. As long as the suction pump connected to the conveying and collection system is operating, the gate 41 is biased into the open position by the differential pressure created between the interior of the duct 20 and the ambient atmospheric pressure. Moreover, even without the operation of the suction pump, with the gate 41 being swung into the open position, either the weight of the lever 46 or the force of the bailing air flowstream emanating from the drillhole impinging on the surface of the gate would normally be sufficient to hold the gate in the open position. As soon as the rig operator witnesses an increase in dust or a substantial quantity of unwetted drill cuttings emanating from the duct portion 20, the gate 41 would be returned to the closed position by rotating the lever 46 so that the conveying and collection system could resume normal operation to remove the coarse and fine drill cuttings in the manner described in Application Ser. No. 223,036.

Those skilled in the art will appreciate that various features, characteristics and advantages of the present invention have been set forth herein or are readily realizable from the detailed description of the preferred embodiments. However, the disclosure is illustrative and various changes may be made while utilizing the principles of the present invention and falling within the scope of the invention as expressed in the appended claims.

What I claim is:

1. Apparatus for conveying drill cuttings material entrained in a bailing air flowstream emanating from a drillhole comprising:
   a head member defining a flow passage for receiving said flowstream from the mouth of said drillhole, said head member including a lower peripheral edge;
   a duct portion of said head member extending substantially upward at an acute angle with respect to the longitudinal axis of said flow passage in said head member for conducting said flowstream to a drill cuttings separation chamber disposed remote from said drillhole; and
   means operable for diverting at least a major portion of said flowstream from said duct portion and to the exterior of said head member to prevent clogging of said passage with said material, said means for diverting said flowstream including means for closing off said duct portion between said peripheral edge of said head member and said chamber.

2. The apparatus set forth in claim 1 wherein:
   said means for diverting said flowstream comprises a gate defined by a wall part of said duct portion and movable between a closed position providing a substantially unobstructed flow path through said duct portion and an open position blocking said flow path and diverting said flowstream to the exterior of said apparatus generally adjacent to said head member.

3. Apparatus for conveying drill cuttings material entrained in a bailing air flowstream emanating from a drillhole comprising:
   a head member defining a flow passage for receiving said flowstream from the mouth of said drillhole, said head member including a lower peripheral edge;
   a duct portion of said head member for conducting said flowstream to a drill cuttings separation chamber disposed remote from said drillhole; and
   means for diverting at least a major portion of said flowstream from said duct portion and to the exterior of said head member to prevent clogging of said passage means with said material, said means for diverting said flowstream comprising a gate defined by a wall part of said duct portion and movable between a closed position providing a substantially unobstructed flow path through said duct portion and an open position blocking said flow path and diverting said flowstream to the exterior of said apparatus generally adjacent to said head member.

4. The apparatus set forth in claim 2 or 3 wherein:
   said gate is pivotally connected to said duct portion for movement between said open and closed positions.

5. The apparatus set forth the claim 5 wherein:
   said means for diverting said flowstream includes actuating means for moving said gate between said positions, said actuating means including a projection engageable by a drill rig operator to move said gate between said positions.

6. The apparatus set forth in claim 4 wherein:
   said duct portion includes a pair of removable support members including bearing means for rotatably supporting said gate for pivotal movement between said open and closed positions.

7. The apparatus set forth in claim 2 or 3 wherein:
   said apparatus includes a flowstream suction pump for producing a pressure differential between said duct portion and the exterior of said apparatus to bias said wall part in said open position.

8. The apparatus set forth in claim 2 or 3 together with:
   actuating means for biasing said means for diverting said flowstream in open and closed positions with respect to said duct portion.

9. The apparatus set forth in claim 8 wherein:
   said means comprise a lever pivotally mounted on said duct portion, said lever being rotatable about a pivot axis in such a way that gravity biases said lever to hold said means for diverting said flowstream in either an open or closed position.

10. The apparatus set forth in claim 9 wherein:
    said means for diverting said flowstream includes a cam having spaced apart projections thereon and forming a lost motion coupling with a projection formed on said lever.

11. Apparatus for conveying drill cuttings material entrained in a bailing air flowstream emanating from a drillhole comprising:
- a head member defining a flow passage for receiving said flowstream from the mouth of said drillhole;
- an elongated relatively narrow duct extending from said head member for conducting said flowstream to an enclosure forming an enlarged drill cuttings separation chamber; and
- means operable for diverting at least a major portion of said flowstream from said duct and to the exterior of said head member between said head member and said enclosure to prevent clogging of said passage with said material, said means for diverting said flowstream comprising a wall part of said duct forming a closure over an opening in said duct and movable between a first position disposed over said opening to provide for flow through said duct and a second position substantially blocking said duct and diverting said flowstream through said opening to the exterior of said head member.

* * * * *

UNITED STATES PATENT AND TRADEMARK OFFICE
CERTIFICATE OF CORRECTION

PATENT NO. : 4,440,243

DATED : April 3, 1984

INVENTOR(S) : D. Franklin Howeth

It is certified that error appears in the above-identified patent and that said Letters Patent is hereby corrected as shown below:

Column 6, line 36, in Claim 5, "5" before wherein should be --4--.

Signed and Sealed this

Twenty-eighth Day of August 1984

[SEAL]

Attest:

GERALD J. MOSSINGHOFF

Attesting Officer     Commissioner of Patents and Trademarks